United States Patent
Liu (10) Patent No.: US 8,390,242 B2
(45) Date of Patent: *Mar. 5, 2013

(54) ANALOG PHOTOVOLTAIC POWER CIRCUIT

(75) Inventor: Jing-Meng Liu, Jubei (TW)

(73) Assignee: Richtek Technology Corporation, Hsin-Chu (TW)

( * ) Notice: Subject to any disclaimer, the term of this patent is extended or adjusted under 35 U.S.C. 154(b) by 457 days.

This patent is subject to a terminal disclaimer.

(21) Appl. No.: 12/770,080

(22) Filed: Apr. 29, 2010

(65) Prior Publication Data

US 2010/0206353 A1    Aug. 19, 2010

Related U.S. Application Data

(62) Division of application No. 11/879,115, filed on Jul. 16, 2007, now abandoned.

(30) Foreign Application Priority Data

Dec. 26, 2006    (TW) ................................ 95148904 A (51) Int. Cl.
*H01M 10/46* (2006.01)

(52) U.S. Cl. .................................................. 320/101

(58) Field of Classification Search .................. 320/101, 320/107, 128, 134, 136; 136/290, 291, 193
See application file for complete search history.

(56) References Cited

U.S. PATENT DOCUMENTS

2006/0208704 A1 * 9/2006 Iwane et al. .................. 320/132
2010/0181014 A1 * 7/2010 Raymond et al. ............. 156/209

FOREIGN PATENT DOCUMENTS

JP        2000-261979        9/2000

* cited by examiner

*Primary Examiner* — Edward Tso
(74) *Attorney, Agent, or Firm* — Tung & Associates (57) ABSTRACT

The present invention discloses an analog photovoltaic power circuit, comprising: a photovoltaic device group for receiving photo energy to generate an input voltage; a power stage circuit for converting the input voltage to an output voltage; an optimum voltage estimation circuit for receiving a predetermined voltage and estimating an optimum voltage according to a direction of variation of the input voltage and a direction of variation of the power generated by the photovoltaic device group; and an analog comparison and control circuit for comparing the optimum voltage with the input voltage, to thereby control the operation of the power stage circuit.

13 Claims, 9 Drawing Sheets

ANALOG PHOTOVOLTAIC POWER CIRCUIT

This is a divisional of application(s) Ser. No. 11/879,115 filed on Jul. 16, 2007 now abandoned

FIELD OF INVENTION

The present invention relates to a photovoltaic power circuit, such as a solar cell battery, in particular to a photovoltaic power circuit comprising analog devices, which has a much simpler structure than conventional digital photovoltaic power circuit.

BACKGROUND OF THE INVENTION

Figure 1:
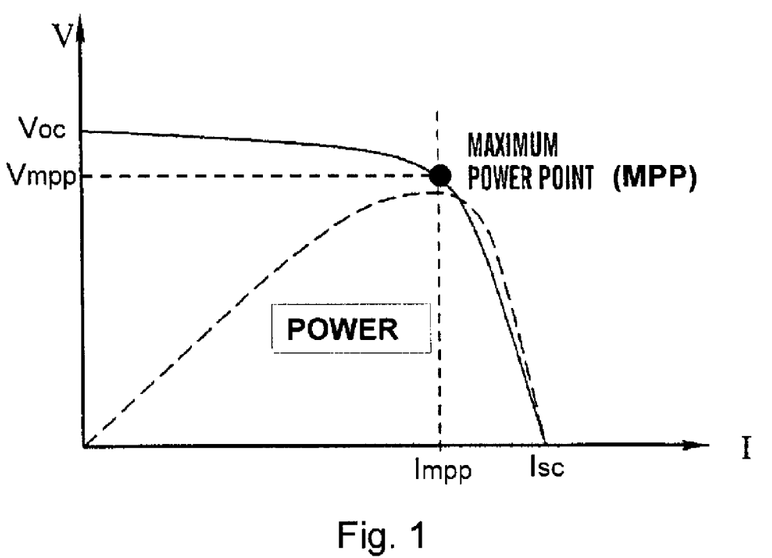
FIG. 1 shows the voltage-current relationship for a photovoltaic device under the same photo energy.

More and more advanced countries are devoting research resources to solar cell batteries, in view of energy crisis. Solar cell batteries belong to the family of photovoltaic power circuits. A photovoltaic power circuit functions by means of the characteristics of semiconductor PN junctions. The PN junctions transfer the received photo energy to electric energy, and charge a battery with the electric energy so that it can generate power. FIG. 1 shows the V-I (voltage-current) relationship for a PN junction diode to generate electric energy, in which the solid line represents the relationship between voltage and current, and the dot line represents the product of voltage and current (V*I), i.e., power. The figure shows only one curve because it is assumed that the received photo energy remains unchanged, If the received photo energy changes, the curve correspondingly changes.

As shown by the curve in FIG. 1, the maximum voltage point Voc is at the open circuit point, while the maximum current point Isc is at the short circuit point. However, the maximum power output point is neither at the maximum voltage point nor at the maximum current point, but at a maximum power point MPP, with corresponding optimum voltage Vmpp and optimum current Impp. Because the received photo energy often keeps varying, prior art digital photovoltaic power circuits have to make complicated calculation, by sophisticated digital circuit, to extract the electric energy at the MPP corresponding to the received photo energy.

Figure 2:
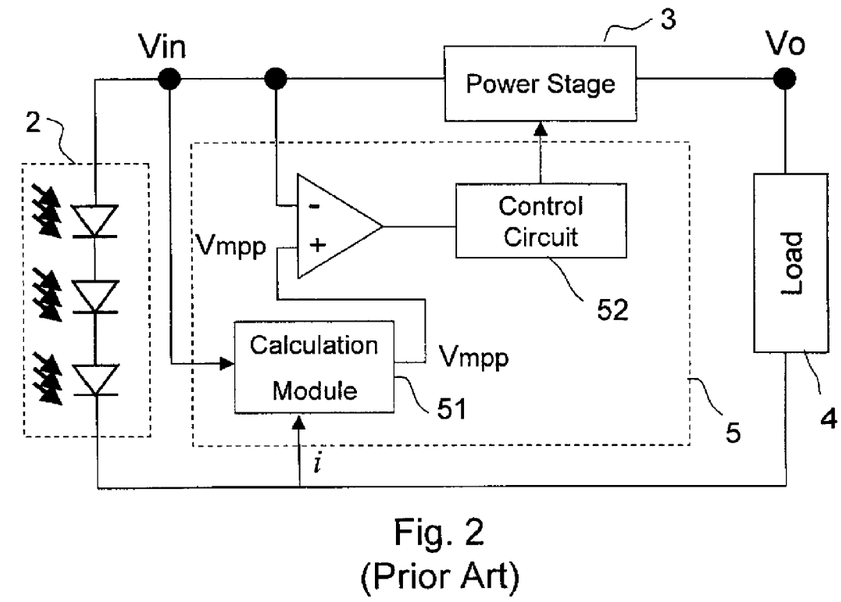
FIG. 2 is a schematic circuit diagram showing a prior art photovoltaic power circuit.

An example of such prior art digital photovoltaic power circuit is disclosed in U.S. Pat. No. 6,984,970, which is shown in FIG. 2 in a simplified form. The voltage Vin generated by a photovoltaic device 2 is converted to output voltage Vout by a power stage 3, to be supplied to a load 4. The load 4 for example can be a charging battery, and the power stage 3 for example can be a boost converter, a buck converter, an inverter, a fly-back converter, etc. To keep the power stage 3 extracting electric energy at the MPP, a digital controller 5 is provided in the circuit, which includes a digital calculation module 51 (e.g., a digital microcontroller) that keeps multiplying the value of the voltage Vin with the value of the extracted current I to obtain the MPP, and further calculates the optimum voltage Vmpp based on the obtained MPP. The calculated voltage Vmpp is compared with the input voltage Vin, and the comparison result drives a controller circuit 52 to control the power stage 3. The digital controller 5 shown in FIG. 2 is very sophisticated; it requires a huge number of transistors, and it requires analog-to-digital converters (ADC) to capture voltage and current signals. Inevitably, this increases difficulties and cost of the circuit and its design.

Another prior art digital photovoltaic power circuit is disclosed in US Patent Publication No. 2006/0164065. This prior art only briefly explains the idea that the circuit includes a search mode and a dithering mode. In the initial search mode, the circuit sweeps the voltage-current curve to find the MPP; thereafter, it enters the dithering mode in which it operates according to the current value corresponding to the MPP, and periodically samples and updates the vale (for details, please refer to paragraphs 0008, 0010, 0033 and FIG. 5 of the patent publication). However, this cited patent publication does not explain how it "sweeps" to find the MPP.

Although there is no detailed circuit structure illustrating how it sweeps, it can be seen from the description relating to the search mode and the sweeping process that this cited patent publication, even if it does not require multiplication of multiple voltage and current values (in fact one can not see how it omits such complicated calculation from the specification of this cited patent publication), requires many digital circuits such as memories or registers and comparators; otherwise it can not select and memorize the maximum power point MPP. In addition to the complexity of the circuit, the sweeping process proposed by this cited patent publication occupies effective operation time of the circuit. Moreover, if light intensity changes after initialization, causing the photovoltaic device to deviate from the original voltage-current curve, the circuit has to reinitiate the search mode with the sweeping process, which is very inefficient.

In brief, US Patent Publication No. 2006/0164065 requires a complicated circuit and an inefficient process to find the MPP point, so that it can operate in the dithering mode in an analogous manner. Obviously this is disadvantageous.

SUMMARY OF THE INVENTION

In view of the foregoing, it is desirous, and thus an object of the present invention, to provide an analogue photovoltaic power circuit that improves the drawbacks in prior art.

To achieve the above and other objects, in one aspect of the present invention, an analog photovoltaic power circuit, comprising: a primary photovoltaic device group for receiving photo energy and generating an input voltage; a power stage for converting the input voltage to an output voltage; an optimum voltage point estimation circuit for estimating an optimum voltage point according to a ratio of the open circuit voltage of the primary photovoltaic device group; and an analog comparison and control circuit for controlling the conversion operation of the power stage according to a comparison between the optimum voltage point estimated by the optimum voltage point estimation circuit and the input voltage.

In the above-mentioned aspect of the present invention, the ratio is preferably about 70% to about 90% of the open circuit voltage, such as 80%. Because the optimum voltage point is obtained from a ratio of the open circuit voltage of the primary photovoltaic device group, it is not required to use a sophisticated digital calculation circuit, nor any sweeping process.

In another aspect of the present invention, an analog photovoltaic power circuit comprises: a primary photovoltaic device group for receiving photo energy and generating an input voltage, the input voltage corresponding to an input current; a power stage for converting the input voltage to an output voltage; an optimum voltage point estimation circuit receiving a predetermined voltage and estimating an optimum voltage point according to (1) a direction of variation of the input voltage and a direction of variation of the power generated by the primary photovoltaic device group, or (2) a direction of variation of the input current and a direction of variation of the power generated by the primary photovoltaic device group; and an analog comparison and control circuit for controlling the conversion operation of the power stage according to a comparison between the optimum voltage point estimated by the optimum voltage point estimation circuit and the input voltage.

In the above-mentioned aspect of the present invention, it is not required to precisely calculate the maximum power point at the initialization stage; the initial value of the optimum voltage point can start from a rough starting point. The rough starting point can be a divisional voltage from a predetermined voltage obtained by a simple voltage divider circuit. The predetermined voltage can be a fixed voltage, or obtained from the primary photovoltaic device group, or obtained from a reference photovoltaic device group, without any sophisticated calculation. Furthermore, it is not required to precisely calculate the power generated by the primary photovoltaic device group, but only required to know the direction of its variation. Hence, a very simple power meter, or a simple power trend meter that only estimates the trend of the power changes (that the power is increasing or decreasing) is sufficient. In some cases, it is sufficient to use even a current sensing circuit, and use the current value sensed by the circuit to represent power.

In yet another aspect of the present invention, a method for extracting energy from a photovoltaic device group comprises the steps of: providing a reference voltage of about 70% to about 90% of an open circuit voltage of the photovoltaic device group; comparing an output voltage of the photovoltaic device group with the reference voltage, to control the output voltage of the photovoltaic device group substantially at the reference voltage; and extracting energy from the photovoltaic device.

In still another aspect of the present invention, a method for calculating an optimum voltage point of a photovoltaic device group comprises the steps of: providing a predetermined initial value of a reference voltage; estimating a direction of variation of the output voltage of the photovoltaic device group; estimating a direction of variation of the output power of the photovoltaic device group; comparing the two directions, and increasing the reference voltage when both directions are the same, and decreasing the reference voltage when both directions are opposite; and using the adjusted reference voltage as the optimum voltage point.

In yet another aspect of the present invention, a method for calculating an optimum voltage point of a photovoltaic device group comprises the steps of: providing a predetermined initial value of a reference voltage; estimating a direction of variation of the output current of the photovoltaic device group; estimating a direction of variation of the output power of the photovoltaic device group; comparing the two directions, and decreasing the reference voltage when both directions are the same, and increasing the reference voltage when both directions are opposite; and using the adjusted reference voltage as the optimum voltage point.

BRIEF DESCRIPTION OF THE DRAWINGS

These and other features, aspects, and advantages of the present invention will become better understood with reference to the following description, appended claims, and accompanying drawings.

DETAILED DESCRIPTION OF THE PREFERRED EMBODIMENT

The key feature of the present invention is that it uses analog circuit devices, which are much simpler than the devices in prior art, to calculate the maximum power point MPP in a photovoltaic power circuit. The circuit according to the present invention is thus called "analog photovoltaic power circuit". However, it should be understood that the term "analog photovoltaic power circuit" only means that the key functions of the circuit are achieved by analog devices; it does not mean that all of the circuit devices are analog devices.

In general, the optimum voltage Vmpp is about 70% to about 90% of the open circuit voltage Voc. Thus, in the first concept of the present invention, the optimum voltage Vmpp is estimated as about 70% to about 90% of the open circuit voltage Voc of the photovoltaic power circuit.

Figure 3:
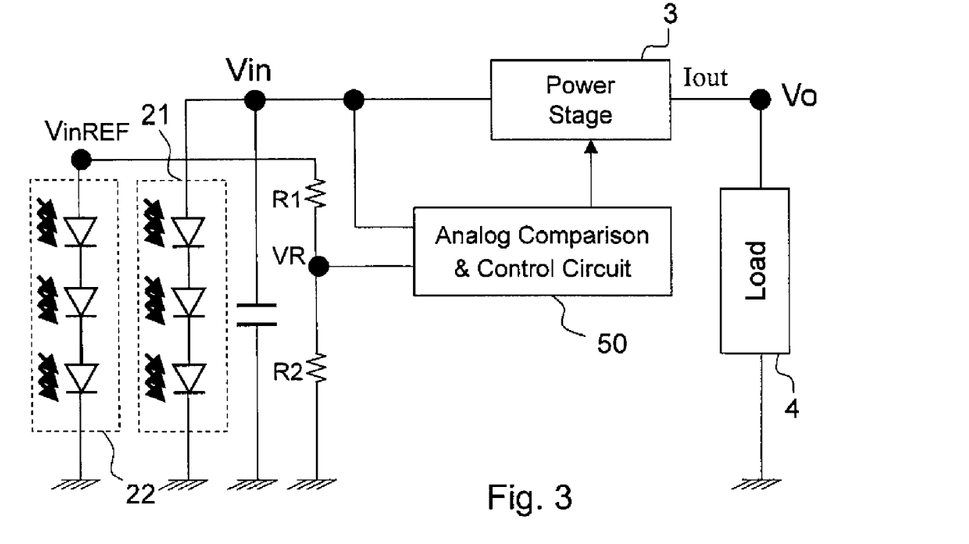
FIG. 3 is a schematic circuit diagram showing a first embodiment according to the present invention.

Referring to FIG. 3, it is a schematic circuit diagram showing a first embodiment according to the present invention. In this embodiment, Vmpp is estimated as about BO % of Voc (wherein the number 80% is for illustrative purpose; it can be any number). As shown in the figure, this embodiment includes a primary photovoltaic device group 21 and a reference photovoltaic device group 22. The primary photovoltaic device group 21 generates electric energy, while the reference photovoltaic device group 22 serves to estimate the optimum voltage Vmpp. The voltage generated by the primary photovoltaic device group 21 is supplied to a power stage 3 as its input voltage yin; the power stage 3 for example can be a boost converter, a buck converter, an inverter, a fly-back converter, etc. The power stage 3 is controlled by an analog comparison and control circuit 50, to lock Vin at the MPP, and to receive energy from its input terminal, by a manner below.

The reference photovoltaic device group 22 generates a reference voltage VinREF. Because the reference photovoltaic device group 22 corresponds to a very small load, the reference voltage VinREF is about equal to the open circuit voltage of the reference photovoltaic device group 22. The reference photovoltaic device group 22 is proportional to the primary photovoltaic device group 21, that is, the number or size of its devices is so arranged that the open circuit voltage of the reference photovoltaic device group 22 is about equal to, or is a ratio of the open circuit voltage Voc of the primary photovoltaic device group 21. The resistors R1 and R2 divide the reference voltage VinREF so that the voltage at the node VR is about equal to 80% of the open circuit voltage Voc of the primary photovoltaic device group 21, i.e., the estimated Vmpp.

Preferably, the voltage at the node VR and the input voltage Vin are compared in the analog comparison and control circuit 50, and the comparison result controls the power stage 3 to receive energy from its input terminal. When the input voltage Vin is larger than the voltage at the node VR, the power stage 3 extracts more current from its input terminal; when the input voltage Vin is smaller than the voltage at the node VR, the power stage 3 reduces current it extracts from its input terminal. According to the voltage-current curve shown in FIG. 1, when current increases, the output voltage of the primary photovoltaic device group 21 decreases, that is, the input voltage Vin decreases. On the other hand, when current decreases, the output voltage of the primary photovoltaic device group 21 increases, that is, the input voltage Vin increases. Thus, by mechanism of comparison and feedback control, the input voltage Vin will be locked at the voltage at the node VR, so that the input voltage Vin is at the estimated Vmpp. In this way, the power stage 3 works at its optimum operation point, to receive maximum energy.

Figure 4:
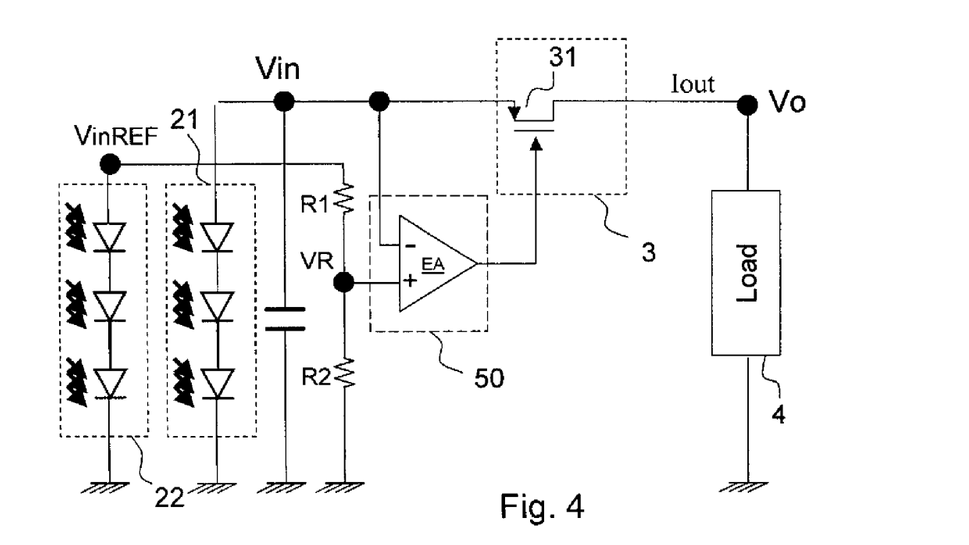
FIG. 4 is a schematic circuit diagram showing a second embodiment according to the present invention.

The analog comparison and control circuit 50 can be embodied by a very simple linear regulator, as referring to the second embodiment shown in FIG. 4. In this embodiment, an analog output from the error amplifier EA controls a power transistor 31 of the power stage 3. The conduction of the power transistor 31 follows the analog output from the error amplifier EA, and the conduction decides the current to be extracted from the primary photovoltaic device group 21.

There is power loss in a linear regulator. To avoid it for better efficiency, the linear regulator can be replaced by a switching regulator, such as, using a PWM (pulse width modulation) circuit in the analog comparison and control circuit 50. The details of a PWM circuit and how it regulates voltage are not explained here for that they are known by one skilled in this art. It should be noted that the use of a PWM circuit is not the only approach; other modulation circuits such as PFM (pulse frequency modulation) circuit can be used in the analog comparison and control circuit 50.

Figure 5:
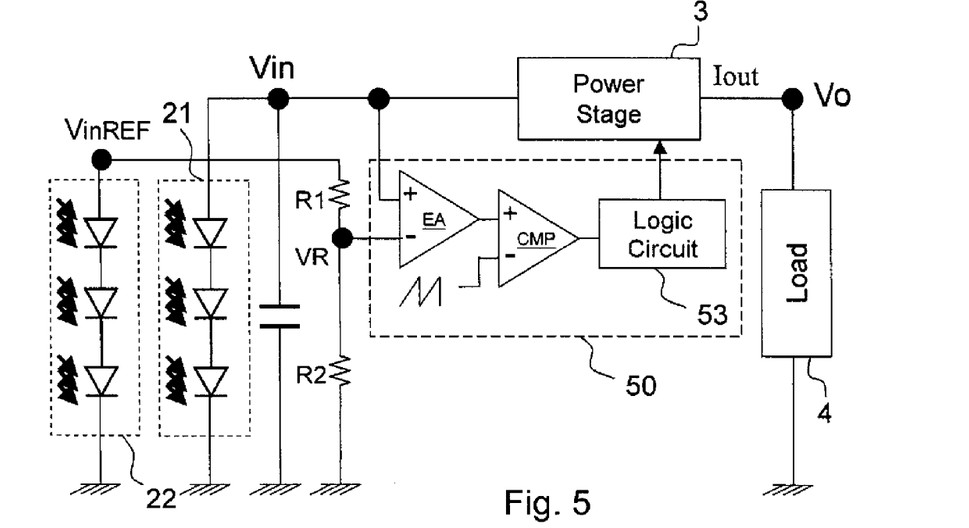
FIG. 5 is a schematic circuit diagram showing a third embodiment according to the present invention.

As an example, please refer to FIG. 5, which is the third embodiment according to the present invention. In this embodiment, the analog comparison and control circuit 50 includes an error amplifier EA, which receives the voltage at the node VR as its reference voltage, and receives the voltage Vin as the feedback voltage (maybe better phrased as "feedforward" voltage), and compares them with each other. The result of comparison is inputted to a comparator CMP, to be compared with a sawtooth wave. A logic circuit receives the output from the comparator CMP, to generate a signal to be used for controlling the power stage 3.

It should be noted that the above-mentioned is only one possible arrangement; there are other arrangements to achieve the same or similar purpose. The key point is to control the power stage 3 to extract energy according to the comparison between the voltage at the node VR and the input voltage Vin, in which the voltage at the node VR (about equal to Vmpp) can be obtained by a simple voltage division circuit, without complicated digital calculation module.

Under the above teaching, those skilled in this art can readily think of many variations. For example, the resistors R1 and R2 can be replaced by other devices having suitable DC resistances. Moreover, if the number of diodes connected in series in the reference photovoltaic device group 22 is arranged to be around 70%-90% of the number of diodes connected in series in the primary photovoltaic device group 21, the resistors R1 and R2 even can be omitted. All such variations should fall within the scope of the present invention.

Figure 6:
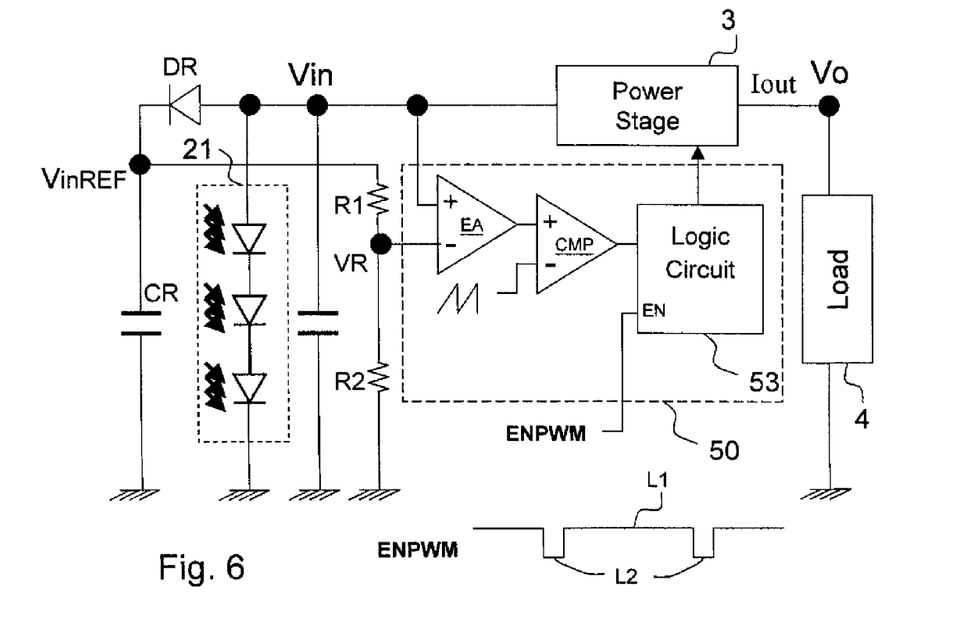
FIG. 6 is a schematic circuit diagram showing a fourth embodiment according to the present invention.

In the embodiment of FIG. 5, the energy generated by the reference photovoltaic device group 22 is unutilized because it is not supplied to the load 4. If it is desired to fully utilize the energy generated by every photovoltaic device, under the spirit of the present invention, the circuit can be modified as below. FIG. 6 is a schematic circuit diagram showing a fourth embodiment according to the present invention. In this embodiment, all photovoltaic devices are productive (hence, the circuit only includes the primary photovoltaic device group 21, without the reference photovoltaic device group 22). On the one hand, the primary photovoltaic device group 21 generates the input voltage Vin; on the other hand, it is electrically connected to ground via a diode DR and a capacitor CR. The voltage across the capacitor CR is the reference voltage VinREF. When the power stage 3 is not active, the right side of the input voltage node Vin is equivalent to an open circuit; the input voltage Vin is equal to the open circuit voltage Voc of the primary photovoltaic device group 21, and the reference voltage VinREF is equal to the open circuit voltage Voc minus the voltage across the diode DR. This voltage charges the capacitor CR and becomes the voltage across the capacitor CR. Similar to the previous embodiments, by properly arranging the resistances of the resistors R1 and R2, the voltage at the node VR is equal to about 80% of the open circuit voltage Voc, i.e., about Vmpp. The diode DR can be a normal diode, a Shocky diode, or other diode devices.

In the above-described circuit, when the power stage 3 is active in extracting energy, the right side of the input voltage node Vin is not an open circuit. If the circuit keeps operating in such condition, the input voltage Vin will no more be equal to the open circuit voltage Voc of the primary photovoltaic device group 21. When the capacitor CR gradually discharges, or when the photo energy received by the primary photovoltaic device group 21 varies, the voltage at the node VR inputting to the error amplifier EA will be inaccurate, deviating from Vmpp. Therefore, although the above-described circuit is able to provide the basic function, it is preferred to periodically turn off the power stage 3 so that the right side of the input voltage node Vin is equivalent to an open circuit, and that the capacitor CR can be charged. To periodically charge the capacitor CR can be viewed as an analog calibration process to calibrate the voltage at the node VR so that it is equal to Vmpp. To this end, a circuit embodiment is shown in the figure. The logic circuit 53 has an enable input EN, which receives a signal ENPWM having a waveform as shown in the figure. Most of the time the signal ENPWM enables the logic circuit 53 (L1), but it periodically disables the logic circuit 53 to turn off the power stage 3, so that the capacitor CR can be charged. In practical application, the period L1 can last for several to several tens of seconds, while the period L2 is in the order of milliseconds. The foregoing approach to indirectly turn off the power stage 3 by controlling the logic circuit 53, is only one among many possible approaches. For example, to provide a switch at the right side of the input voltage node Vin, is an alternative. The key point is to periodically turn off the power stage 3 so that the right side of the input voltage node Vin is an open circuit, and that the capacitor CR can be charged. All variations achieving such purpose should fall within the scope of the present invention.

Figure 7:
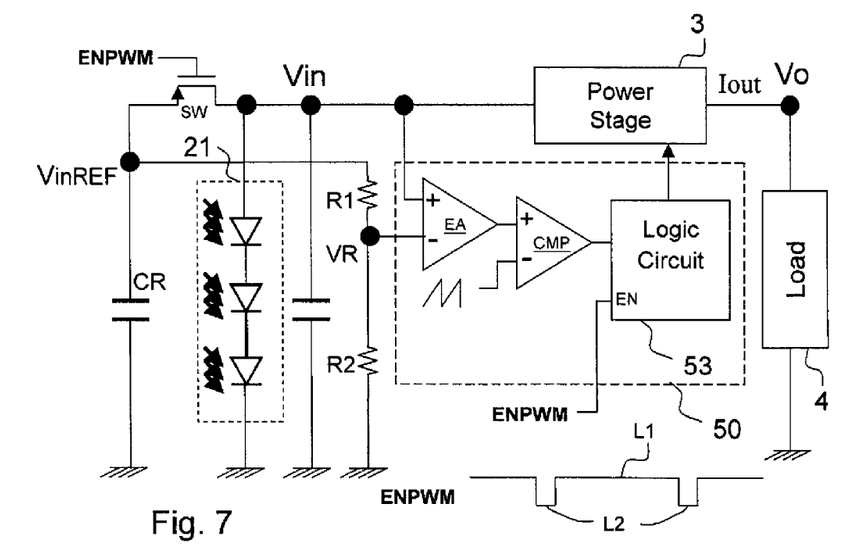
FIG. 7 is a schematic circuit diagram showing a fifth embodiment according to the present invention.

In the embodiment shown in FIG. 6, because the diode only provides one-way conduction, if light intensity decreases drastically, the voltage on the capacitor CR might not follow instantly, affecting the accuracy of the voltage VR. To solve this, as shown in the fifth embodiment of FIG. 7, a switch SW operating in an opposite phase to the signal ENPWM is provided at the left side of the input voltage node Vin (the switch SW may be, e.g., a PMOSFET switch, or an NMOSFET switch operated by an inverted signal of ENPWM). When the power stage is turned off (period L2), the switch SW is ON so that the primary photovoltaic device group 21 can charge the capacitor CR; when the power stage 3 is extracting energy, the switch SW is OFF so that the primary photovoltaic device group 21 only provides voltage to the input voltage node Vin, but does not charge the capacitor CR. Thus, the voltage on the capacitor CR can be kept very close to the open circuit voltage Voc of the primary photovoltaic device group 21.

Figure 8:
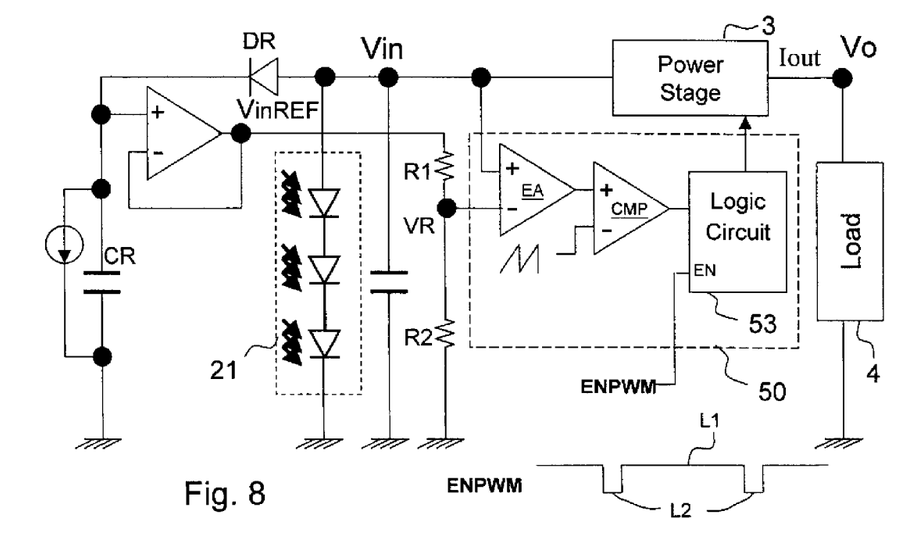
FIG. 8 is a schematic circuit diagram showing a sixth embodiment according to the present invention.
Figure 9:
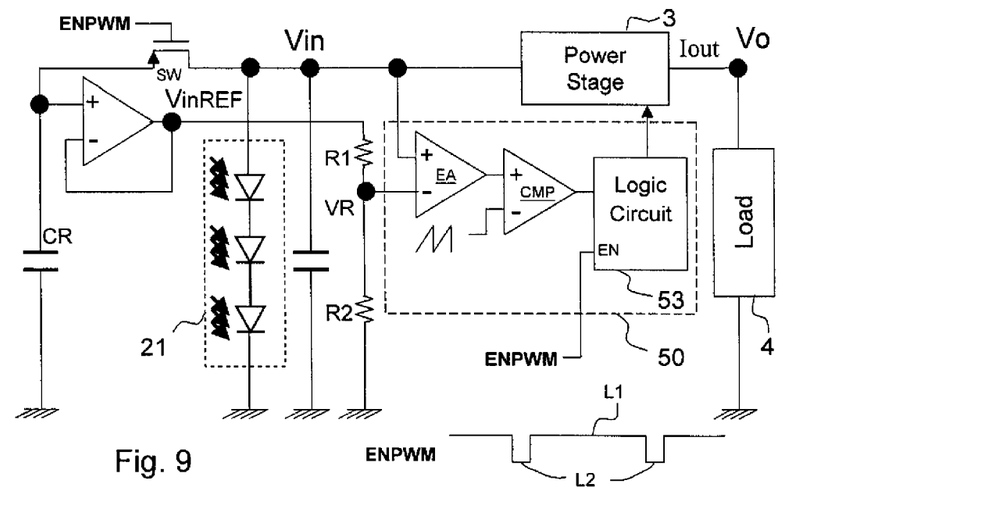
FIG. 9 is a schematic circuit diagram showing a seventh embodiment according to the present invention.

In all of the above-mentioned embodiments, to be precise, when the right side of the input voltage node Vin is open circuit, the primary photovoltaic device group 21 is not in a complete open circuit status, that is, the input voltage Vin is not precisely equal to the open circuit voltage Voc. There is a small amount of load current flowing through the path from the primary photovoltaic device group 21-Vin-DR or SW-VinREF-R1-R2 to ground. Hence, if it is desired to obtained a precise open circuit voltage Voc, and to maintain the voltage on the capacitor CR longer so that the capacitor charging frequency can be reduced, a unit gain circuit can be provided in said path to ensure open circuit status, as shown in the two embodiments of FIGS. 8 and 9. In the sixth embodiment of FIG. 8, because the diode DR only provides one-way conduction, a weak current source of low current amount is provided so that the capacitor CR can be discharged. In the seventh embodiment of FIG. 9, because the switch SW provides bi-directional conduction, a current source is not required. The other parts of these two embodiments are similar to those of FIGS. 6 and 7, and the details thereof are not redundantly repeated here.

The above-mentioned embodiments are based on an estimation of Vmpp as 70% to 90% of the open circuit voltage Voc. Under the second concept of the present invention, Vmpp can be estimated more accurately.

Figure 10:
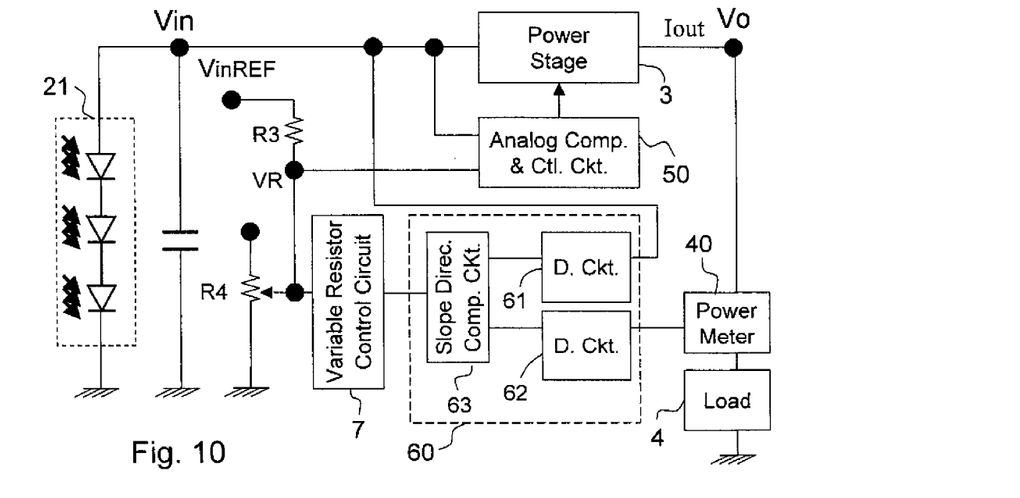
FIG. 10 is a schematic circuit diagram showing an eighth embodiment according to the present invention.

FIG. 10 shows the eighth embodiment according to the present invention. In this and following embodiments, the analog comparison and control circuit 50 is shown as a simple block without showing its details, for simplicity of the drawings. The reference voltage VinREF in this embodiment can be extracted from the output of the primary photovoltaic device group 21, or the output of a reference photovoltaic device group (not shown), or a predetermined constant voltage. A fixed resistor R3 and a variable resistor R4 form a variable voltage divider circuit which divides the reference voltage VinREF to determine the voltage at the node VR; in other words, the resistance of the variable resistor R4 determines the voltage at the node VR, making it equal to Vmpp. It should be noted that the variable resistor R4 is only one among many usable devices; any other device with variable resistance, even if its resistance does not vary linearly, can be used for the purpose of the present invention, such as a MOSFET, a JFET, a pinch-resistor, etc. The key point is to adjust the voltage at the node VR by the variable voltage divider circuit; any arrangement serving this purpose meets the requirement of the present invention.

The resistance of the variable resistor R4 is controlled by a variable resistor control circuit 7 in a manner as follows. Referring to FIG. 1, at the left side of the MPP on the V-I curve, when voltage decreases, power increases, with opposite slope directions; at the right side of the MPP on the V-I curve, when voltage increases, power increases, with the same slope directions. Thus, by a comparison between the slope direction of the output voltage of the primary photovoltaic device group 21 and the slope direction of the output power, it can be decided as to where the present V-I relationship stands, i.e., at the left side or right side of the MPP. The resistance of the variable resistor R4 can be adjusted accordingly to move the voltage at the node VR towards Vmpp. Under this concept, in the circuit of FIG. 10, a direction comparison circuit 60 is provided, which receives the input voltage Vin (corresponding to the output voltage of the primary photovoltaic device group 21) and the power at the output terminal (corresponding to the output power of the primary photovoltaic device group 21), and compares their slope directions. The comparison result is sent to the variable resistor control circuit 7 for adjusting the resistance of the variable resistor R4.

To adjust the voltage VR by means of a variable resistor control circuit 7 controlling the resistance of a variable resistor R4, is only an illustrative embodiment to show the concept. The spirit is to provide a circuit for adjusting the voltage VR according to a comparison between slope directions of voltage and power. When the slope directions are opposite to each other, the circuit decreases the voltage VR; when the slope directions are the same to each other, the circuit increases the voltage VR. Any variation under this spirit falls within the scope of the present invention.

There are many ways to embody the direction comparison circuit 60, one of which is shown in the figure as an example. A power meter 40 at the right side of the figure measures the power at the output terminal (corresponding to the output power of the primary photovoltaic device group 21), and sends the measured result to a differential circuit (D. Ckt.) 62; the output of the derivative circuit 62 represents the slope of the power at the output terminal. On the other hand, another differential circuit (D. Ckt.) 61 receives the input voltage Vin and generates an output representing the slope of the input voltage Vin (corresponding to the slope of the output voltage of the primary photovoltaic device group 21). A slope direction comparison circuit (Slope Direct. Comp. Ckt.) 63 receives the outputs from the circuits 61 and 62, and compare the directions of the two slopes. The comparison result is sent to the variable resistor control circuit 7 for adjusting the resistance of the variable resistor R4.

Figure 11:
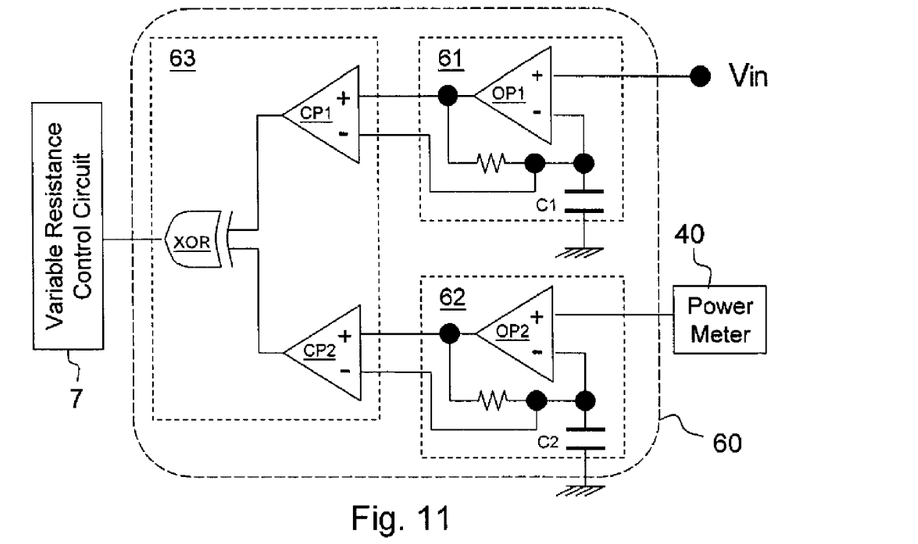
FIG. 11 is a schematic circuit diagram showing a ninth embodiment according to the present invention.

The ninth embodiment shown in FIG. 11 shows an example of detailed structure of the direction comparison circuit 60. It includes operational amplifiers OP1 and OP2, and comparators CP1 and CP2. The comparators CP1 and CP2 respectively compare the outputs of the operational amplifiers OP1 and OP2 with the voltage stored in the capacitors C1 and C2 at a previous time point, and determine the slope directions. The output of the exclusive OR gate XOR indicates whether the slope directions are the same or opposite. It should be noted here that what FIG. 11 shows is only one example among many possible arrangements, which is not intended to limit the scope of the present invention. For instance, the differential circuits 61 and 62 in FIGS. 10 and 11 can be replaced by other high pass filter circuits to obtain the same effect. This is because, under the concept of the present invention, it is not required to obtain accurate values of the slopes, but instead only the slope directions of the output voltage and the output power of the primary photovoltaic device group 21.

As another example, the function of the comparators CP1 and CP2 is to transfer the outputs of the operational amplifiers OP1 and OP2 to digital signals for inputting into the exclusive OR gate XOR. If the operational amplifiers OP1 and OP2 are designed so that their outputs can be distinguished and recognized by a logic operation circuit, the slope direction comparison circuit 63 does not have to include the comparators CP1 and CP2; the outputs of the operational amplifiers OP1 and OP2 can be compared with each other directly.

Figure 12:
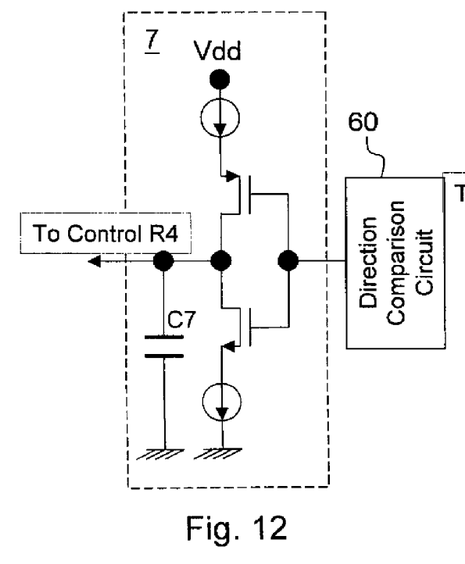
FIG. 12 is a schematic circuit diagram showing a tenth embodiment according to the present invention.
Figure 13:
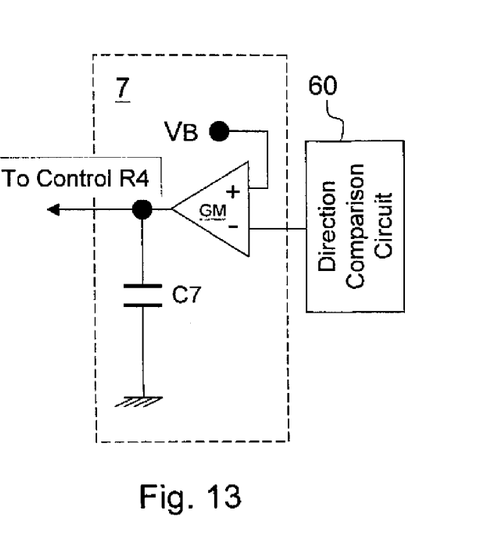
FIG. 13 is a schematic circuit diagram showing an eleventh embodiment according to the present invention.

FIGS. 12 and 13 show two examples of the detailed structure of the variable resistor control circuit 7, which are the tenth and eleventh embodiments of the present invention. Again, these two embodiments are illustrative rather than limiting. In details, in the embodiment shown in FIG. 12, when the output of the direction comparison circuit 60 is low, the upper PMOS switch is ON, so that the capacitor C7 is charged along a positive direction and adjust the variable resistor R4 corresponding to the positive direction; when the output of the direction comparison circuit 60 is high, the lower NMOS switch is ON, so that the capacitor C7 is charged along a negative direction and adjust the variable resistor R4 corresponding to the negative direction. The foregoing "positive" and "negative" directions, the types and locations of the PMOS and NMOS transistors, and the adjusted directions of the variable resistor R4, can be arranged according to the design of the direction comparison circuit 60. For example, if the exclusive OR gate XOR is replaced by an exclusive NOR gate XNOR, then opposite signals and devices should be used.

The embodiment of FIG. 13 includes a transconductor GM which generates current corresponding to the comparison between the output of the direction comparison circuit 60 and a reference voltage VB, to charge the variable resistor R4 for controlling the variable resistor R4. The reference voltage VB can be set at a value between the high level and low level of the output of the direction comparison circuit 60, so that, when the output of the direction comparison circuit 60 is low, the transconductor GM generates positive current to charge the capacitor C7 along a positive direction and adjust the variable resistor R4 corresponding to the positive direction; when the output of the direction comparison circuit 60 is high, the transconductor GM generates negative current to charge the capacitor C7 along a negative direction and adjust the variable resistor R4 corresponding to the negative direction. Similar to the previous embodiment, the "positive" and "negative" directions (the positive and negative inputs of the transconductor GM) can be arranged according to the output types of the direction comparison circuit 60, i.e., they may be reversed if needed.

Figure 14:
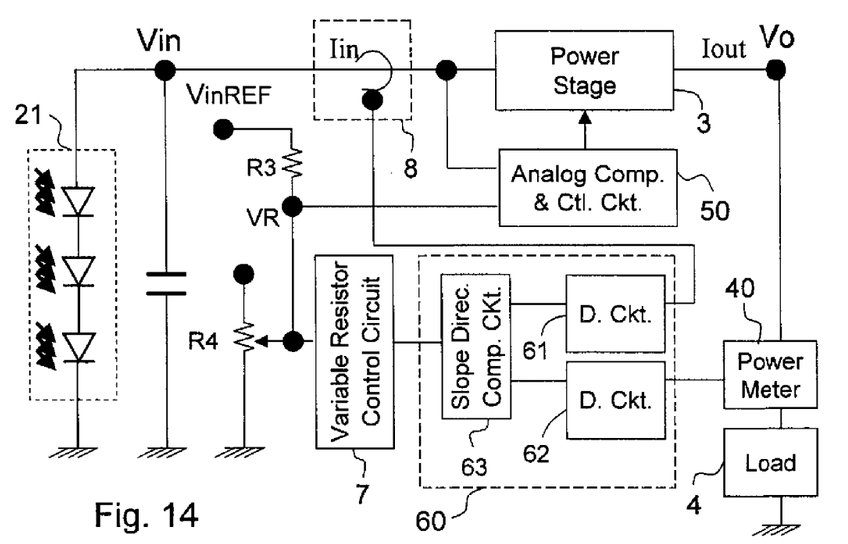
FIG. 14 is a schematic circuit diagram showing a twelfth embodiment according to the present invention.

Referring to FIG. 1 again, according to the present invention, besides determining MPP based on the voltage-power relationship, it is also possible to determine MPP based on the current-power relationship. At the left side of the MPP on the V-I curve, when current increases, power increases, with the same slope directions; at the right side of the MPP on the V-I curve, when current increases, power decreases, with opposite slope directions. Thus, by a comparison between the slope direction of the output current of the primary photovoltaic device group 21 and the slope direction of the output power, it can be decided as to where the present V-I relationship stands, i.e., at the left side or right side of the MPP. FIG. 14 shows the twelfth embodiment of the present invention to embody this concept.

In the embodiment shown in FIG. 14, a current sensing circuit 8 senses the input current Iin (the output current of the primary photovoltaic device group 21), which is compared with the output of the power meter 40 (the output power of the primary photovoltaic device group 21) in the direction comparison circuit 60. The resistance of the variable resistor R4 is adjusted according to the result of comparison, to move the voltage at the node VR towards Vmpp. Apparently, because the relationship between current and power slope directions is opposite to the relationship between voltage and power slope directions, the detailed structure of the direction comparison circuit 60 or the variable resistor control circuit 7 should be designed based on such fact. For example, if a circuit shown in any of FIGS. 11-13 is used, an inverter gate should be added at a proper location, or an exclusive NOR gate XNOR should be used instead of the exclusive OR gate XOR, or the locations of the PMOS and NMOS transistors in FIG. 12 should be interchanged, or the positive and negative inputs of the transconductor GM should be interchanged, etc.

The same as above, to adjust the voltage VR by means of a variable resistor control circuit 7 controlling the resistance of a variable resistor R4, is only an illustrative embodiment to show the concept. The spirit is to provide a circuit for adjusting the voltage VR according to a comparison between slope directions of current and power. When the slope directions are opposite to each other, the circuit decreases the voltage VR; when the slope directions are the same to each other, the circuit increases the voltage VR. Any variation under this spirit falls within the scope of the present invention.

Figure 15:
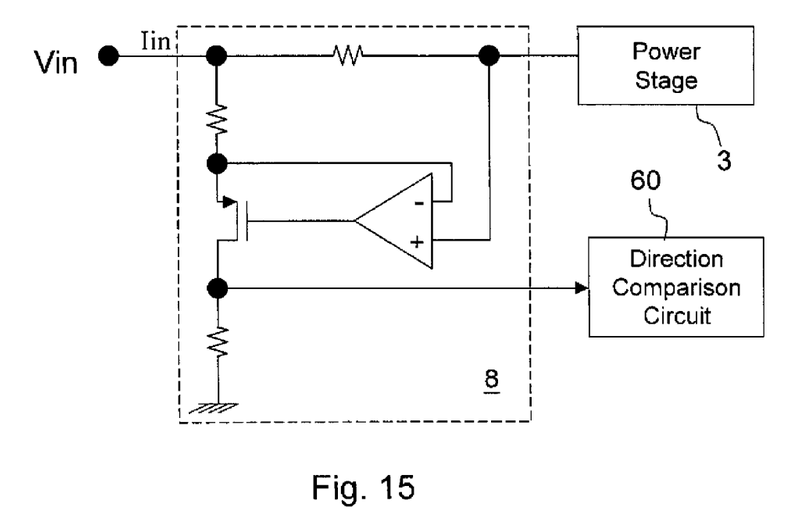
FIG. 15 shows an example of a current sensing circuit.

There are many ways to embody the current sensing circuit 8, one of which is shown in FIG. 15. The circuit shown in FIG. 15 senses the current Iin and transfers it to a voltage signal to be sent to the direction comparison circuit 60. Again, this embodiment is for illustration, not for limitation.

Figure 16:
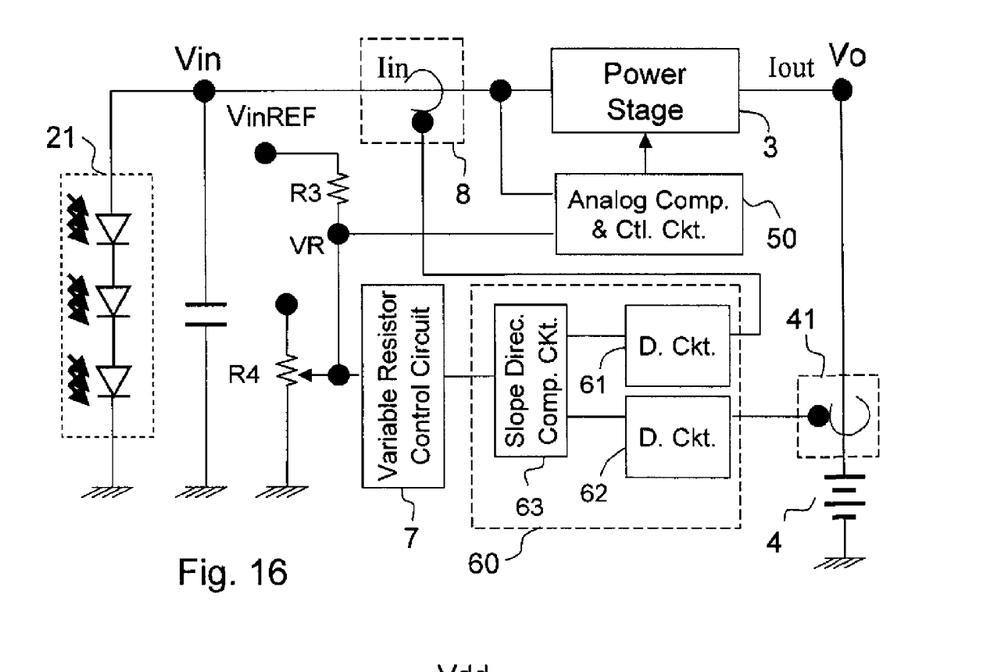
FIG. 16 is a schematic circuit diagram showing a thirteenth embodiment according to the present invention.

A power meter 40 is used in the embodiments of FIGS. 10, 11 and 14. From a first sight, the use of a power meter complicates the circuit, because a power meter needs to measure and calculate product of current and voltage values. Actually, under the concept of the present invention, it does not require an accurate measurement of power, and thus it does not require a sophisticated power meter. What is required is only to know the direction of changes of the output power of the primary photovoltaic device group 21; therefore, it is sufficient to use a very simple power meter (as described later with reference to FIGS. 17 and 18), or even without a power meter. FIG. 16 shows the thirteenth embodiment of the present invention, which is a variation based on the embodiment of FIG. 14. As shown at the right side of the figure, since the load 4 is a battery inmost cases, and the voltage of a battery changes very slowly, the power meter 40 can be replaced by a current sensing circuit 41 which only measures the current flowing to the load 4, and transfers the sensed result to a voltage signal to be inputted to the differential circuit 62. Thus, the same purpose as that of the circuit shown in FIG. 14 can be achieved. An example of the detailed structure of the current sensing circuit 41 is shown in FIG. 15. Likely, the right side of FIG. 10 or FIG. 11 can be replaced by a current sensing circuit in a similar fashion.

Figure 17:
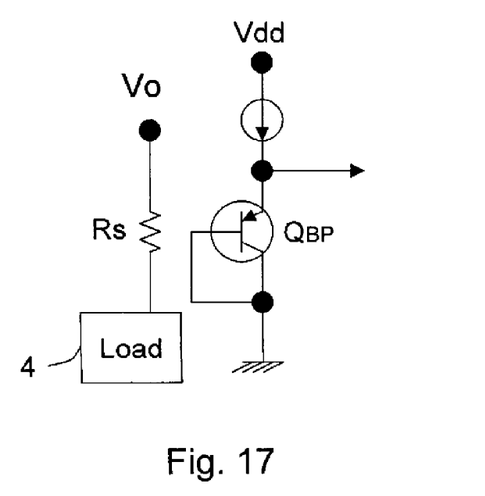
FIG. 17 is a schematic circuit diagram showing a fourteenth embodiment according to the present invention.

If it is desired to take the voltage variation of the load 4 into consideration, we can use a "power trend meter" having a much simpler structure, instead of a power meter. A power trend meter compares the power at the present time point with the power at a previous time point, and generates a signal corresponding to the comparison result. It should be emphasized that the power trend meter only needs to show the direction of power changes, which does not even need to be proportional to the actual power changes. An example of such power trend meter is shown in FIG. 17 as the fourteenth embodiment of the present invention, wherein the power trend is estimated by sensing the heat of a resistor. As shown in the figure, a bipolar transistor $Q_{BP}$ is used to sense the heat variation on a resistor Rs. In general, the base to emitter voltage variation ($dV_{BE}$) of a bipolar transistor corresponds to temperature variation (dT) as:

$$dV_{BE}/dT \approx -2 \text{ mV}/°\text{C}.$$

Thus, the voltage variation can be used to represent the power trend. However, it should be noted that this is an inverted analog signal and should be processed accordingly.

Figure 18:
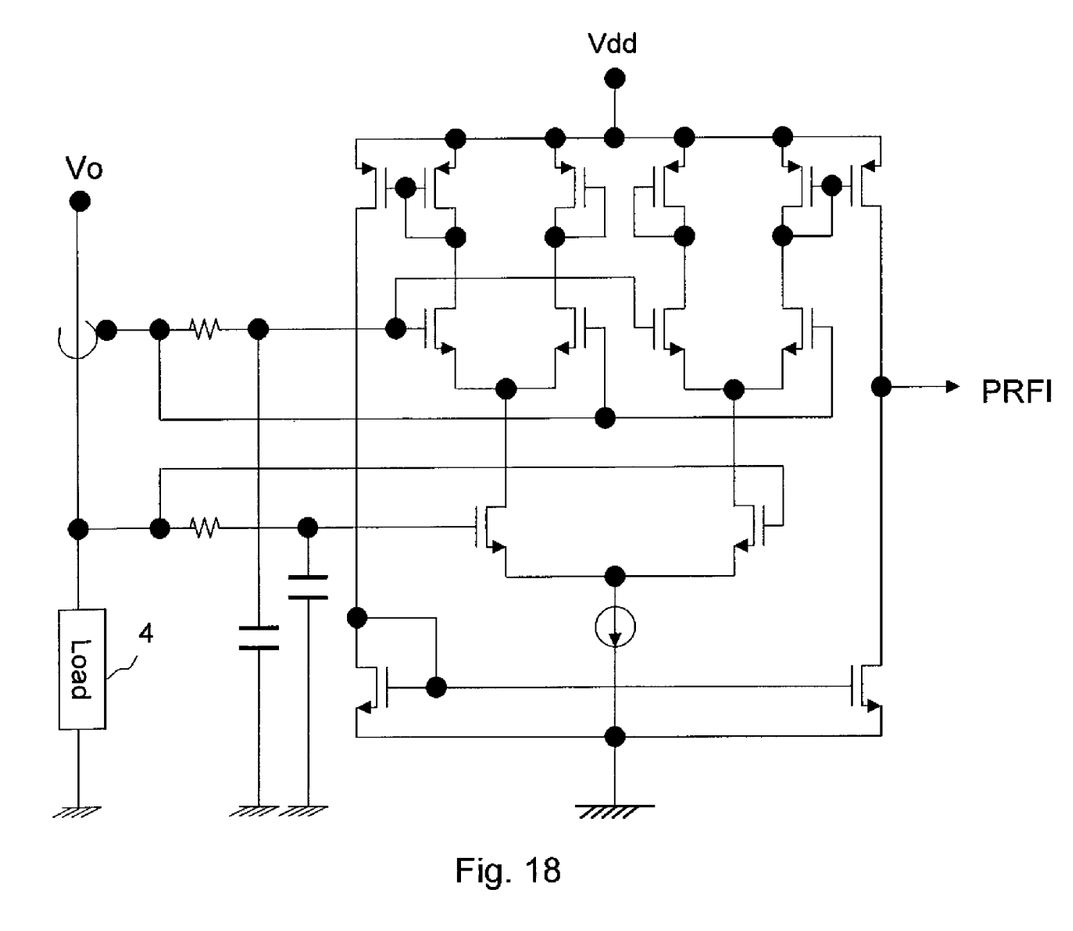
FIG. 18 is a schematic circuit diagram showing a fifteenth embodiment according to the present invention.

If it is desired to detect the actual current and voltage, that is, if it is not desired to simply measure the power trend, the fifteenth embodiment of the present invention shown in FIG. 18 provides a simple solution. Please refer to FIG. 11 in conjunction with FIG. 18, the circuit of FIG. 18 includes the power meter 40, the differential circuit 61, and the comparator CP2. The output signal PRFI indicates the power changing direction, i.e., the plus or minus sign of d(V*I)/dt, in which d(V*I) is the power change, and dt is the time change. PRFI is a digital signal which can be sent to the exclusive OR gate XOR in FIG. 11 for a logic operation with the output from the comparator CP1, to generate a control signal for controlling the variable resistor control circuit 7. As shown in FIG. 18, although the circuit detects current and voltage, no complicated multiplication is required, so the circuit is much simpler than a typical power meter.

In summary, in order to obtain precise MPP, prior art circuits requires complicated digital calculation circuits to calculate precise current and voltage values, which requires transistors in the number of several tens of thousands; however, the analog circuit according to the present invention only requires less than one thousandth of transistors in number as compared with prior art. Thus, the present invention is apparently much more advantageous than prior art.

The spirit of the present invention has been explained in the foregoing with reference to the preferred embodiments, but it should be noted that the above is only for illustrative purpose, to help those skilled in this art to understand the present invention, not for limiting the scope of the present invention. Within the same spirit, various modifications and variations can be made by those skilled in this art. For example, additional devices may be interposed between any two devices shown in the drawings, such as a delay circuit, a switch, or a resistor, without affecting the primary function of the circuit. In view of the foregoing, it is intended that the present invention cover all such modifications and variations, which should interpreted to fall within the scope of the following claims and their equivalents.

What is claimed is:

1. An analog photovoltaic power circuit, comprising:
   a primary photovoltaic device group for receiving photo energy and generating an input voltage;
   a power stage for converting the input voltage to an output voltage which is supplied to a load;
   an optimum voltage point estimation circuit receiving a predetermined voltage and estimating an optimum voltage point according to a direction of variation of the input voltage and a direction of variation of the power generated by the primary photovoltaic device group, wherein the direction of variation of the power is obtained by measuring a trend of a power supplied to the load without calculating or measuring an absolute value of the power; and
   an analog comparison and control circuit for controlling the conversion operation of the power stage according to a comparison between the optimum voltage point estimated by the optimum voltage point estimation circuit and the input voltage.

2. The analog photovoltaic power circuit as claimed in claim 1, wherein the optimum voltage point estimation circuit includes a variable voltage divider circuit for dividing the predetermined voltage to obtain the optimum voltage point.

3. The analog photovoltaic power circuit as claimed in claim 2, wherein the optimum voltage point estimation circuit includes a direction comparison circuit for comparing the direction of variation of the input voltage and the direction of variation of the power generated by the primary photovoltaic device group, and controlling the variable voltage divider circuit according to the comparison result.

4. The analog photovoltaic power circuit as claimed in claim 3, wherein the direction comparison circuit includes:
   a first high-pass filter receiving the input voltage;
   a second high-pass filter receiving an indicator representing the power generated by the primary photovoltaic device group; and
   a slope direction comparison circuit comparing the outputs of the first and second high-pass filters.

5. The analog photovoltaic power circuit as claimed in claim 4, wherein the first and second high-pass filters are differential circuits.

6. The analog photovoltaic power circuit as claimed in claim 1, wherein the trend of the power supplied to the load is obtained according to a current supplied to the load without calculating or measuring a voltage of the load.

7. The analog photovoltaic power circuit as claimed in claim 1, wherein the trend of the power supplied to the load is obtained by a power trend meter which senses a heat on a resistive device electrically connected with the load.

8. The analog photovoltaic power circuit as claimed in claim 3, further comprising a current meter which measures a current flowing to the load and inputs the measured result to the direction comparison circuit.

9. The analog photovoltaic power circuit as claimed in claim 1, wherein the predetermined voltage is a fixed voltage taken from the output of the primary photovoltaic device group or the output of a reference photovoltaic device group.

10. An analog photovoltaic power circuit, comprising:
    a primary photovoltaic device group for receiving photo energy and generating an input voltage;
    a power stage for converting the input voltage to an output voltage which is supplied to a load;
    an optimum voltage point estimation circuit receiving a predetermined voltage and estimating an optimum voltage point according to a direction of variation of the input voltage and a direction of variation of the power generated by the primary photovoltaic device group, wherein the direction of variation of the power is obtained by a power-change direction indication circuit providing an output signal indicating the power-change direction; and
    an analog comparison and control circuit for controlling the conversion operation of the power stage according to a comparison between the optimum voltage point estimated by the optimum voltage point estimation circuit and the input voltage.

11. The analog photovoltaic power circuit as claimed in claim 10, wherein the output signal is a digital signal indicating the plus or minus sign of d(V*I)/dt, in which d(V*I) is the power change, and dt is the time change.

12. The analog photovoltaic power circuit as claimed in claim 10, wherein the power-change direction indication circuit includes:
    a first RC circuit obtaining a first delayed signal relating to a current to the load;

a second RC circuit obtaining a second delayed signal relating to a voltage to the load; and an analog circuit determining the power-change direction according to first delayed signal, second delayed circuit, a signal relating to a current to the load, and a signal relating to a voltage to the load.

13. The analog photovoltaic power circuit as claimed in claim 12, wherein the analog circuit determining the power-change direction includes:

a first analog multiplier circuit generating a first derived signal proportional to the product of the current and the voltage to the load;

a second analog multiplier circuit generating a second derived signal proportional to the product of the first delayed signal and the second delayed signal; and a summing node comparing the first derived signal and the second derived signal to determine the power-change direction.

* * * * *